(12) United States Patent
Maheshwari

(10) Patent No.: US 6,853,762 B1
(45) Date of Patent: Feb. 8, 2005

(54) OPTICAL SWITCH CASCADING SYSTEM AND METHOD WITH VARIABLE INCIDENCE ANGLE CORRECTION

(75) Inventor: Dinesh Maheshwari, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 133 days.

(21) Appl. No.: 10/155,748

(22) Filed: May 24, 2002

(51) Int. Cl.[7] .................................................. G02B 6/26
(52) U.S. Cl. .............................. 385/16; 385/17; 385/18; 385/37
(58) Field of Search ............................ 385/16–18, 31, 385/37

(56) References Cited

U.S. PATENT DOCUMENTS

| | | | |
|---|---|---|---|
| 4,969,717 A | * 11/1990 | Mallinson | 347/196 |
| 4,991,924 A | 2/1991 | Shankar et al. | 350/96.15 |
| 5,311,360 A | 5/1994 | Bloom et al. | 359/572 |
| 5,319,477 A | * 6/1994 | DeJule et al. | 349/65 |
| 5,345,321 A | * 9/1994 | DeJule et al. | 349/5 |
| 5,568,286 A | * 10/1996 | Riza | 349/74 |
| 5,619,601 A | * 4/1997 | Akashi et al. | 385/16 |
| 5,661,592 A | 8/1997 | Bornstein et al. | 359/291 |
| 6,008,920 A | 12/1999 | Hendrix | 359/127 |
| 6,091,867 A | * 7/2000 | Young et al. | 385/17 |
| 6,169,624 B1 | 1/2001 | Godil et al. | 359/237 |
| 6,198,856 B1 | 3/2001 | Schroeder et al. | 385/17 |
| 6,212,309 B1 | 4/2001 | Nguyen et al. | 385/17 |
| 6,268,952 B1 | 7/2001 | Godil et al. | 359/291 |
| 6,285,473 B1 | * 9/2001 | Nishi et al. | 359/15 |
| 6,320,996 B1 | * 11/2001 | Scobey et al. | 385/18 |
| 6,389,190 B2 | 5/2002 | Solgaard et al. | 385/18 |
| 6,407,851 B1 | * 6/2002 | Islam et al. | 359/291 |
| 6,415,082 B1 | * 7/2002 | Wach | 385/39 |
| 6,473,211 B2 | 10/2002 | Stone | 359/117 |
| 6,493,488 B1 | * 12/2002 | Islam et al. | 385/47 |
| 6,516,107 B1 | * 2/2003 | Gardner et al. | 385/16 |
| 6,580,849 B2 | 6/2003 | Chen et al. | 385/18 |
| 6,631,222 B1 | * 10/2003 | Wagener et al. | 385/16 |
| 2003/0016904 A1 | * 1/2003 | Tajima et al. | 385/16 |

OTHER PUBLICATIONS

Palmer, Christopher "The Physics of Diffraction Gratings" in Diffraction Gratings Handbook, (Rochester, Richardson Grating Laboratory, 2002). pp 16–19.

* cited by examiner

*Primary Examiner*—Ellen E. Kim
(74) *Attorney, Agent, or Firm*—Wagner, Murabito & Hao LLP

(57) ABSTRACT

The present invention is an efficient system and method for cascading optical switches. A plurality of cascaded optical switches form a cascaded optical switch fabric and direct an optical signal beam from one of the plurality of optical switches to another of the plurality of optical switches. In one embodiment of the present invention, a variable incidence corrective device is included in a cascaded optical switch fabric. The incidence corrective device directs an optical signal beam in a shallow angle so that it strikes the next optical switch at a corrected incidence angle. A corrected incidence angle permits an optical signal beam to be forwarded at a relatively shallow angle to an optical switch located in a relatively close proximity on the optical switch fabric. The present invention also provides for refocusing of spreading optical signal beams and mitigation of signal loss.

21 Claims, 21 Drawing Sheets

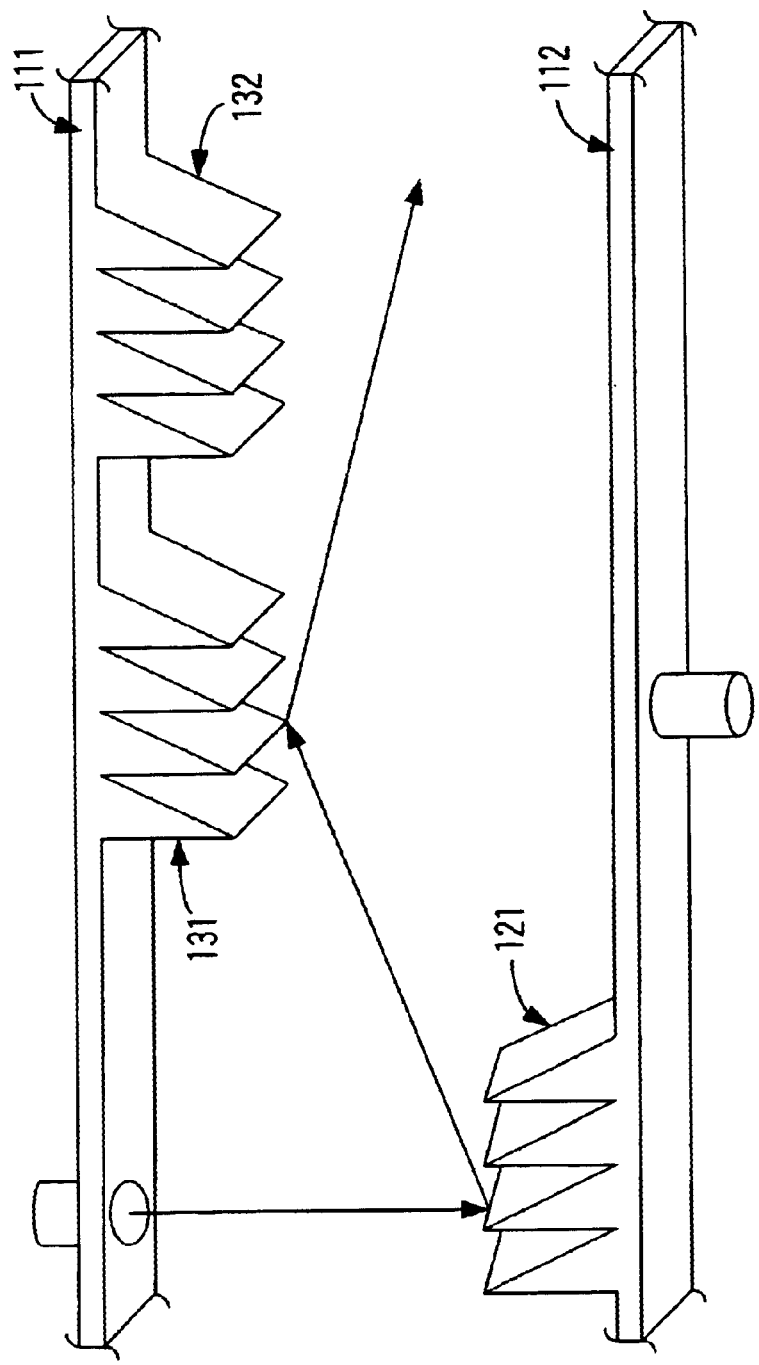

OPTICAL SWITCH CASCADING SYSTEM AND METHOD WITH VARIABLE INCIDENCE ANGLE CORRECTION

FIELD OF THE INVENTION

The present invention relates to the field of optical signal beam manipulation and propagation. More particularly, the present invention relates to a system and method to facilitate cascaded switching of optical signal beams with incidence angle correction and beam spread correction.

BACKGROUND OF THE INVENTION

Systems utilizing various types of signals to represent information have made a significant contribution towards the advancement of modern society and are utilized in a number of applications to achieve advantageous results. Numerous technologies such as digital computers, calculators, audio devices, video equipment, and telephone systems facilitate increased productivity and cost reduction in analyzing and communicating information in most areas of business, science, education and entertainment. Advanced optical signal based technologies offer the potential for rapid processing and communication of large amounts of data associated with a variety of activities. The optical based systems typically involve signal manipulation by signal switching operations. However, a number of optical signal beam manipulation problems associated with achieving optimal incidence angles and/or minimal optical signal beam spreading often make traditional control of the signals difficult or impractical.

To obtain maximized performance from information systems it is usually critical for the information to be processed and communicated rapidly and reliably. Encoding information in optical signals offers the potential for manipulation and conveyance of significant amounts of information very quickly. For example, most optical systems have significant potential bandwidth capacity for processing and communicating a large quantity of data per unit of time. While some types of optical signal beam controls are relatively simple and easy to accomplish such as transmission of an optical signal beam along a confined single waveguide path (e.g., formed by a fiber optic cable strand), other types of optical signal beam control such as dynamically directing an optical signal beam along various paths are relatively difficult.

The ability to control the manipulation and propagation of optical signal beams through a variety of paths usually involves the implementation of switching elements. Switching elements provide a mechanism for directing the optical signal beam to a particular destination, often redirecting the signals along particular designated paths. However, the resources involved in manufacturing attempts at a single switch capable of redirecting optical signals goes up as the number of potential paths increase. Some traditional switching network system configurations attempt to forward a signal to multiple potential destinations by utilizing a network of discrete limited switches connected with external cabling. These traditional attempts typically consume significant resources to manufacture each discrete switch of limited capability and additional resources to "wire" them together (e.g., connect cables between each individual limited switch). Another traditional approaches to switching operations involves converting an optical signal into an electrical signal and vise versa. These approaches are usually slow and require significant resources to implement.

Switching optical signal beams typically involves significant challenges for single switches capable of directing optical signal beams along a variety of paths. The nature of light propagation gives rise to a number of complications that can potentially limit or impede the ability to direct an optical signal beam to a particular destination. Cumulative detrimental effects associated with repeated redirection of optical signals tend to limit the practical utilization of traditional optical switches for applications involving significant control flexibility. The relationship of incidence angles and output angles can give rise to detrimental effects in situations where angles become cumulatively deeper each time an optical switch redirects an optical signal beam. Large incidence angles often prevent the propagation of an optical signal beam to a nearby device at an optimal incidence angle. Another potential detrimental impact of repeated redirection of an optical signal beam is deteriorating divergence or spread of the optical signal beam. Each time an optical beam is switched it spreads and a portion of the signal energy is lost. Theses energy losses are typically cumulative and have adverse impacts on interpreting the weakened signals.

SUMMARY

The present invention is a system and method that facilitates efficient optical signal beam switching. In one embodiment, a present invention cascaded optical switching system is included in a single integrated solution. In one exemplary implementation, the optical signal beam is directed through "free-space" (e.g., air or glass not confined by a waveguide) by cascaded switching elements. The present invention cascaded optical switching system and method facilitates minimization of cumulative detrimental impacts associated with cascaded switching of optical signal beam. For example, a present invention cascaded optical switching system can "regenerate" an optical signal beam path with a realigned or corrected incidence angle. In one embodiment of the present invention, the corrected incidence angle facilitates shortening the cascaded switch fabric length. In one exemplary implementation, a present invention cascaded optical switching system refocuses optical signal beams mitigating adverse impacts (e.g., energy loss) associated with diverging or spreading beams.

In one embodiment a cascaded optical switch fabric includes a plurality of cascaded optical switches, an optical switch support member and a bracing member. The plurality of cascaded optical switches form an optical switch fabric and direct an optical signal beam from one of the plurality of optical switches to another of the plurality of optical switches. The optical switch support member supports the plurality of cascaded optical switches in a cascaded configuration. The bracing member holds the optical switch support members in a cascading position relative to one another forming an optical switch fabric. In one embodiment of the present invention, an incidence corrective device is included in a cascaded optical switch fabric. The incidence corrective device comprises a variety of configurations including a variable reflective optical switch and or a variable diffraction optical switch. A corrected incidence angle permits an optical signal beam to be forwarded at a relatively shallow output angle to an optical switch located in a relatively close proximity on the cascading optical switch fabric. In one embodiment of the present invention, a cascaded optical switch fabric includes a an optical signal beam spread mitigation device. In one exemplary implementation, a present invention optical signal beam spread correction device corrects beam spreading by refocusing the optical signal beam.

DESCRIPTION OF THE DRAWINGS

FIG. 1C is a three dimensional block diagram of one embodiment of a present invention cascaded optical switching system.

DETAILED DESCRIPTION

Reference will now be made in detail to the preferred embodiments of the invention, an optical switch cascading system and method with variable incidence angle correction, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Figure 1A:
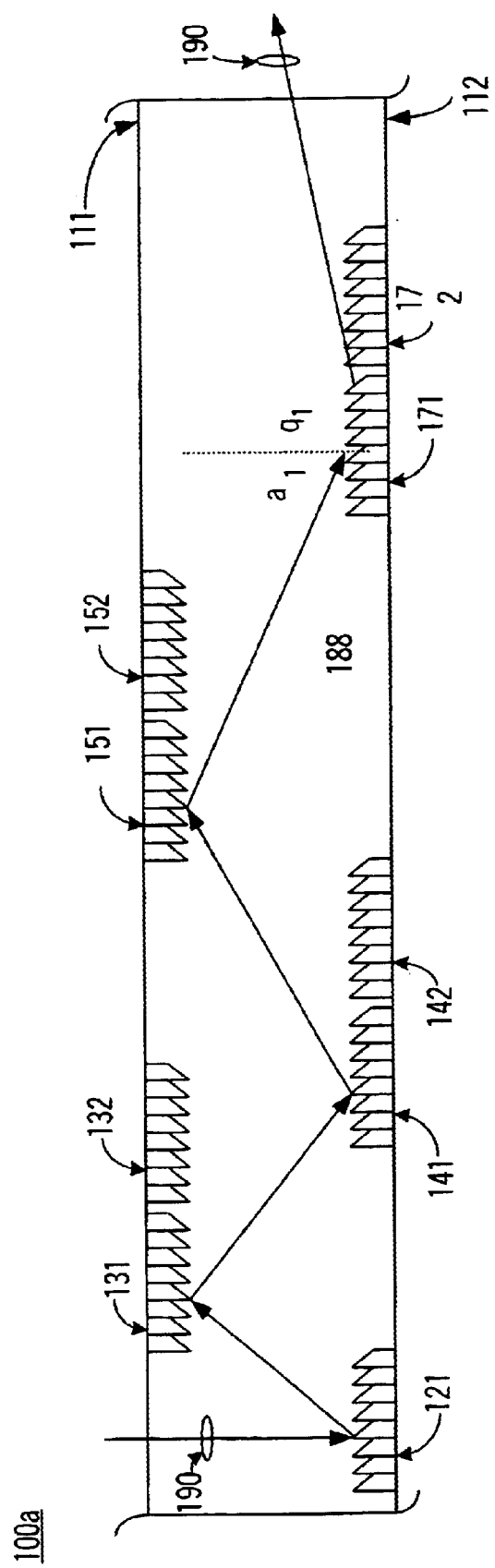
FIG. 1A is a block diagram of a present invention cascaded optical switching system.

FIG. 1A is a block diagram of cascaded optical switching system 100, one embodiment of the present invention. Cascaded optical switching system 100 includes optical switches 121, 131, 132, 141, 142, 151, 152, 171 and 172 and optical switch support members 111 and 112. Optical switch support member 111 is coupled to switches 131, 132, 151, and 152, and optical switch support member 112 is coupled to switches 121, 141, 142, 171, and 172. In one embodiment of the present invention, the optical switches are coupled to support members 111 and 112 in a cascaded pattern.

The components of cascaded optical switching system 100 cooperatively operate to direct the propagation of an optical signal beam though cascaded optical switching system 100. In one embodiment, a present invention cascaded optical switching system is included in a single integrated solution. In one exemplary implementation, the optical signal beam is directed through "free-space" (e.g., air or glass not confined by a waveguide) by cascaded switching elements. In one exemplary implementation of the present invention, an optical signal beam enters a present invention optical switch fabric and is directed along the cascaded optical switches to a particular destination (e.g., to a waveguide such as an optical cable or other optical device).

Figure 1B:
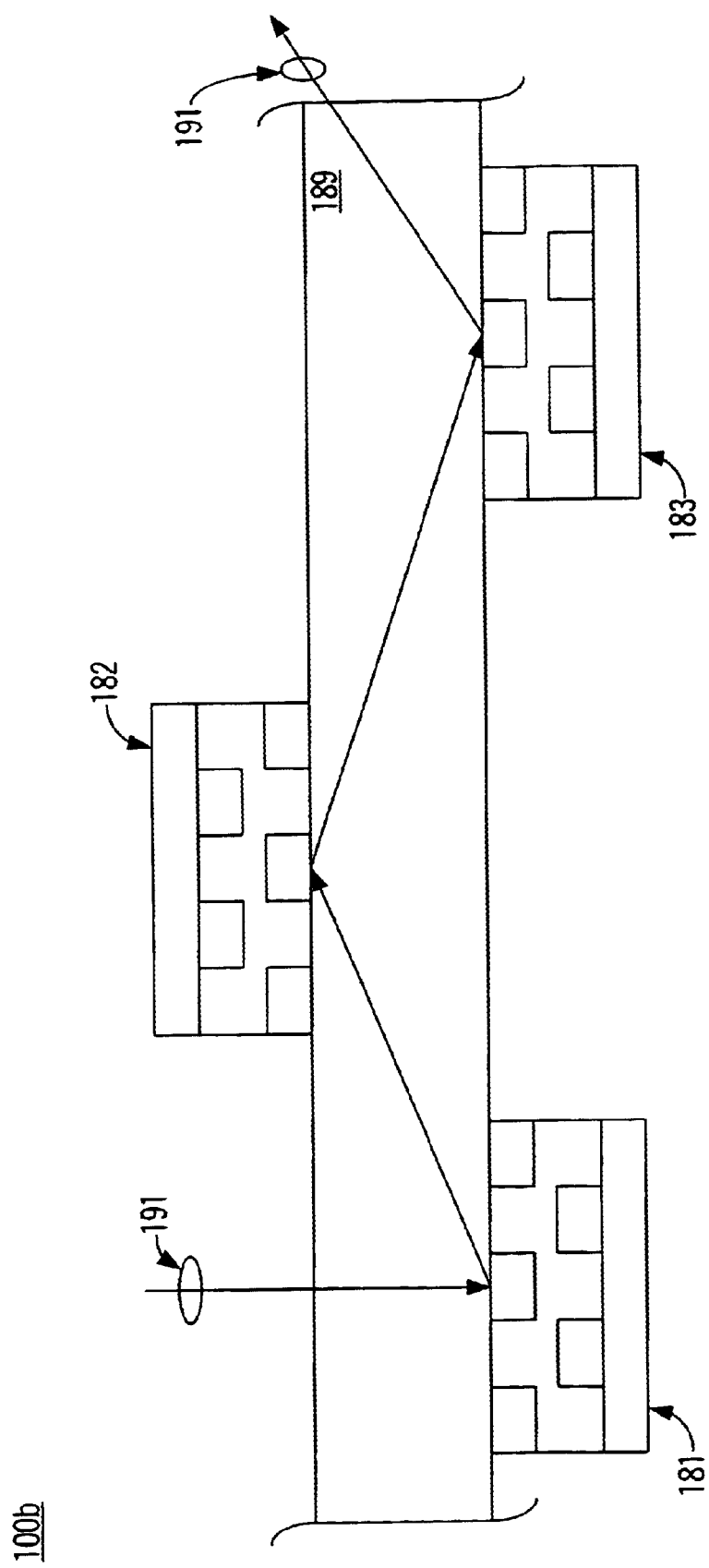
FIG. 1B is a block diagram of an alternate embodiment in which optical switches are mounted on the surface of a single substrate.

In one embodiment of the present invention, the optical switches are arranged in cascaded switching stages in which each stage includes a plurality of optical switches (e.g., a stage such as 131, 132 141, 142, 151, 152, 171 and 172). In one embodiment of the present invention, the optical switch support members 111 and 112 are cascade "boundary" planes coupled to each other by position bracing members (not shown) that hold the optical switch support members in a position relative to one another. In one embodiment of the present invention, optical switch support members 111 and 112 are surfaces of a single substrate 188 (e.g., a free space such as glass) and the optical switches are mounted in the substrate 188. FIG. 1B is a block diagram of an alternate embodiment in which the optical switches (e.g., dynamically variable optical switches 181, 182 and 183) are mounted on the surface of a single substrate 189.

It is appreciated that embodiments of the present invention are well suited for use with a variety of different types of optical switches mounted. In one embodiment of the present invention, optical switches 121, 131, 132, 141, 142, 151, 152, 171 and 172 include a reflective component and in another they include a diffractive component. For example, the diffractive components facilitate easier semiconductor manufacturing processes and the reflective components facilitate easier optical manufacturing processes. The reflective components and diffractive components may be fixed (e.g., direct an optical signal beam at a particular output angle for a given input angle) or dynamically variable (e.g., direct an optical signal beam at variable output angles for a given input angle). In yet another embodiment of the present invention, optical switches 121, 131, 132, 141, 142, 151, 152, 171 and 172 include a variable diffraction component (e.g., a dynamically variable grating based switch). In one exemplary implementation, the optical switches are grated light valve (GLV) switches. In some exemplary implementations, there is a combination of different types of optical switches included in cascaded optical switching system 100.

Figure 1D:
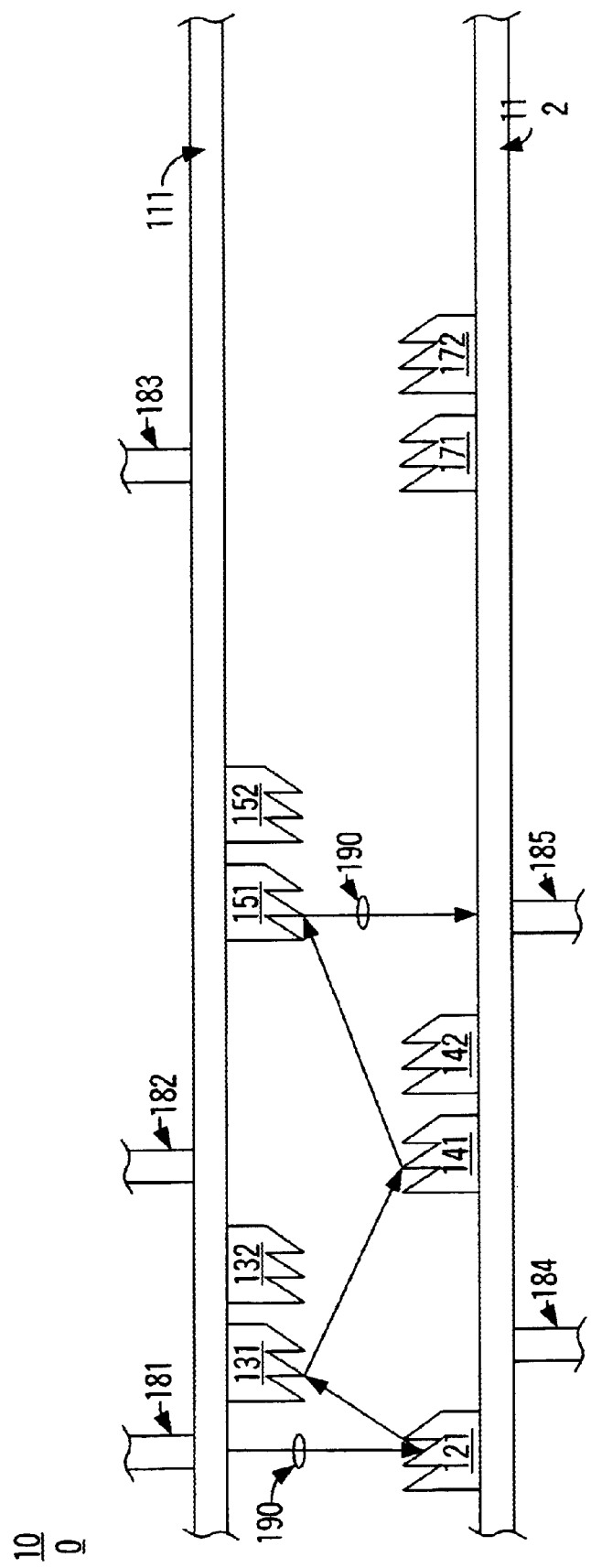
FIG. 1D is a block diagram of one exemplary implementation of a cascaded optical switching system in which an optical signal beam is directed to a path not directly included in the cascading optical switch fabric.

FIG. 1C is a three dimensional block diagram of one embodiment of cascaded optical switching system 100. In one exemplary implementation of the present invention, cascaded optical switching system 100 directs the propagation of optical signal beam 190 along the cascading optical switches 121, 131, 141, 151, and 171. In one embodiment of the present invention, cascaded optical switching system 100 directs optical signal beams to various receivers for paths not directly included in the cascading path of the optical switch fabric. FIG. 1D is a block diagram of one exemplary implementation of cascaded optical switching system 100 in which an optical signal beam is directed to a path not directly included in the cascaded optical switch fabric. FIG. 1D shows optical waveguides 181 through 185 (e.g., fiber optical cables). Optical signal beam 190 is received by cascaded optical switching system 100 from optical waveguide 181 (e.g., a fiber optic cable) and directed in a cascaded fashion from optical switches 121 to optical switch 141 to optical switch 151 which directs the optical signal beam out of the cascaded optical switching system 100 to optical waveguide 185.

Figure 1E:
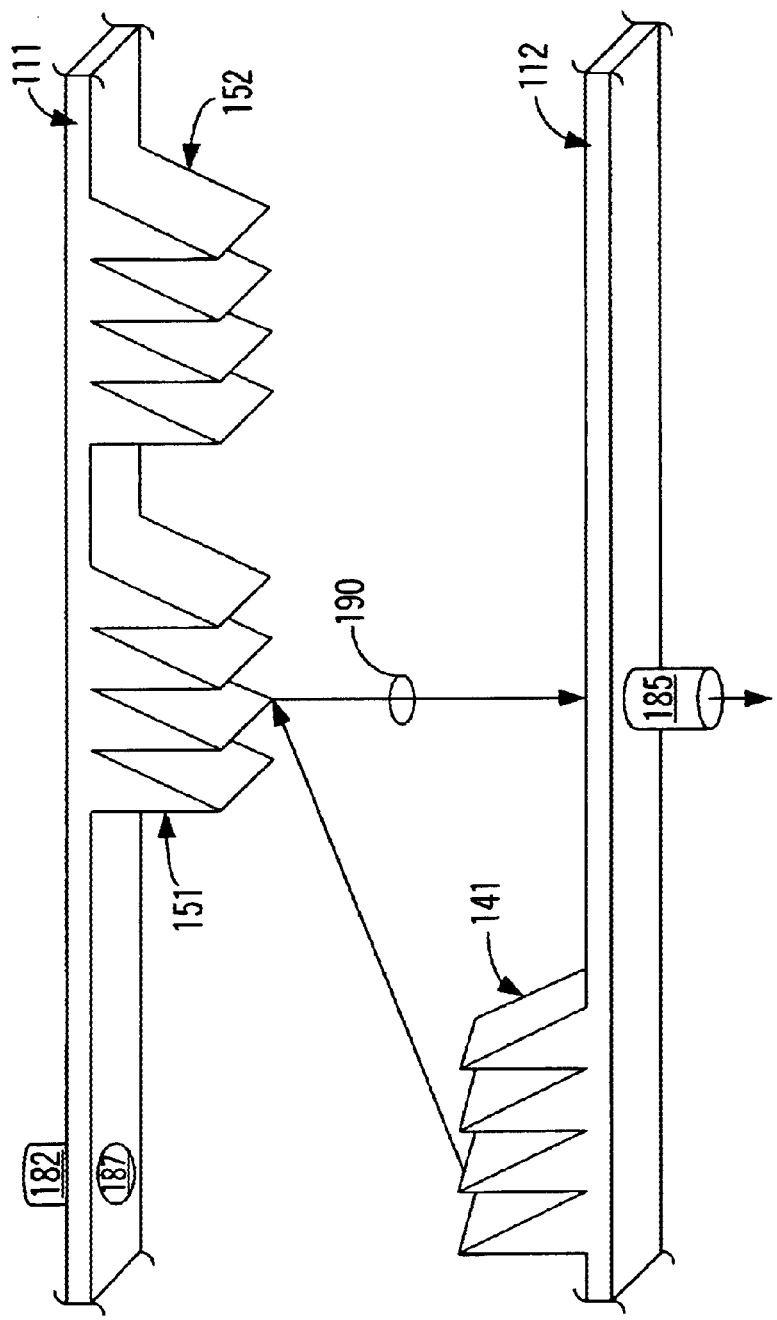
FIG. 1E is a three dimensional block diagram of one exemplary implementation in which a cascaded optical switching system directs an optical signal to an optical waveguide receiver that permits bi-directional propagation of optical signal beams into or out of the cascading optical switch fabric.

FIG. 1E is a three dimensional block diagram of one exemplary implementation in which cascaded optical switching system 100 directs an optical signal beam to an optical waveguide receiver that permits bi-directional propagation of optical signals into or out of the cascaded optical switching system 100. Optical waveguide receiver 187 is shown coupled to optical switch support member 111. In one embodiment of the present invention, optical waveguide receiver 187 is a transparent material that permits an optical signal beam to travel through it. For example, optical signal beam 190 travels though an optical waveguide receiver (e.g., similar to waveguide receiver 187) coupled to optical switch support member 112 when passing through to optical waveguide 185. In one embodiment of the present invention, an optical waveguide receiver is a hole formed by optical switch support member 111 or 112 and optical signals are permitted to travel through the hole. In one exemplary implementation of the present invention, the optical waveguide receiver is coupled to an optical waveguide (e.g., a fiber optic cable) that directs the optical signal beam along a path different from a path included in cascaded optical switching system 100.

Figure 2:
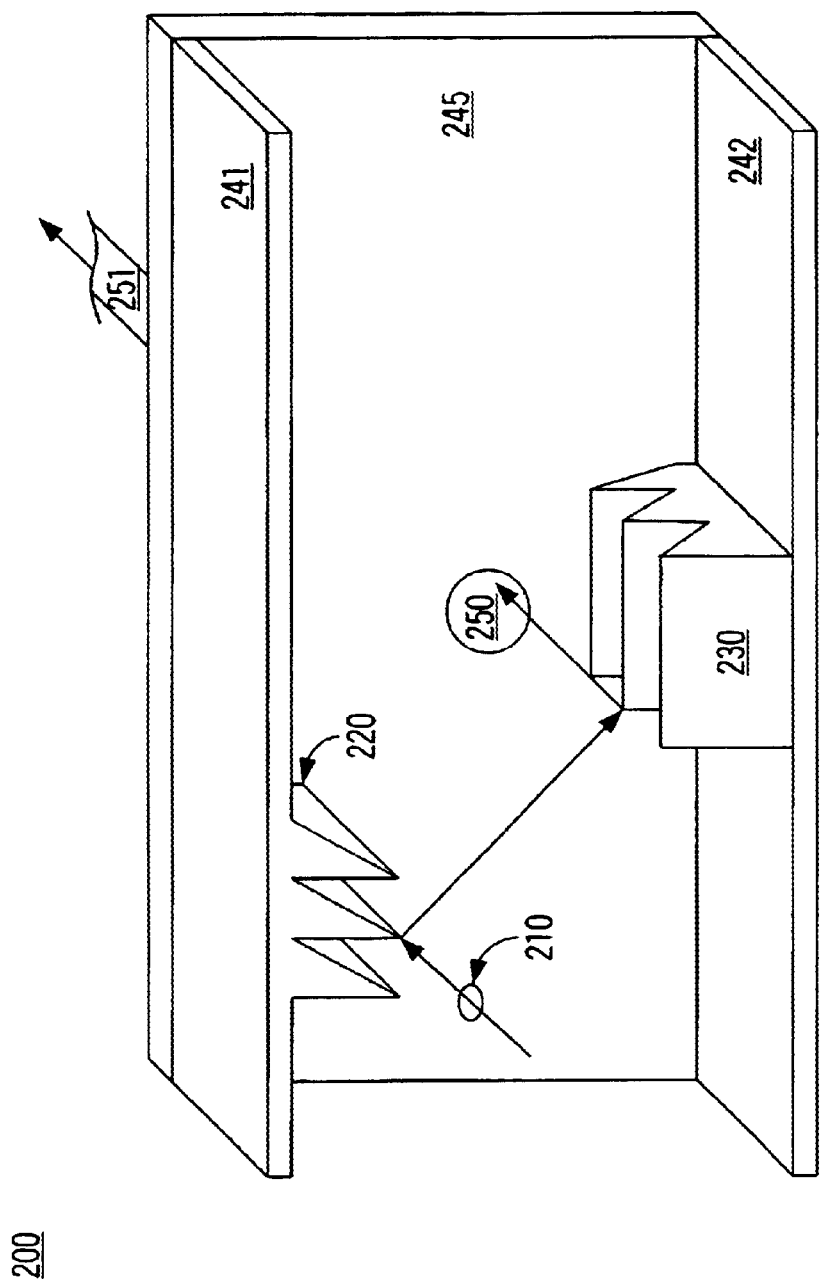
FIG. 2 is a block diagram section of cascaded optical switching system in which an optical signal beam is forwarded in two different spatial planes.

There are a variety of cascading configuration implementations of the present invention cascaded optical switching system 100. In one embodiment of the present invention, cascaded optical switching system 100 directs optical signal beams to a variety of receivers or paths with different spatial orientation. For example, cascaded optical switching system 100 directs optical signal beams to receivers or paths in the same spatial plane as the optical switches (e.g., see FIG. 1D) or in different spatial planes. FIG. 2 is a block diagram section of cascaded optical switching system 200 in which an optical signal beam is forwarded in two different spatial planes. Cascaded optical switching system 200 comprises optical switches 220 and 230, optical switch support members 241 and 245, position bracing member 245 and optical waveguide receiver 250. Optical switch support member 241 is coupled to optical switch 220 and optical switch support member 242 is coupled to optical switch 230. In one embodiment of the present invention, cascaded optical switching system 200 comprises additional optical switches (not shown) upstream and downstream from optical switches 210 and 230 and position bracing member 245 forms a reflective optical switch fabric boundary plane coupled to the optical switch support members 241 and 242.

The components of cascaded optical switching system 200 cooperatively operate to direct the propagation of an optical signal beam though cascaded optical switching system 200. FIG. 2 shows optical waveguide receiver 250 coupled to optical waveguide 251 (e.g., a fiber optical cable) which is in a different spatial plane than the cascaded optical switches of cascaded optical switching system 200. Optical signal beam 210 is received by cascaded optical switching system 200 and directed in a cascaded fashion to optical switch 220 which directs it to optical switch 230. Optical switch 230 directs optical signal beam 210 to optical waveguide receiver 250 which forwards the optical signal beam 210 to optical waveguide 251 (e.g., fiber optical cable). Optical waveguide 251 directs the optical signal beam 210 along a path in a spatial plane different from the cascading plane of cascaded optical switching system 200.

Figure 3A:
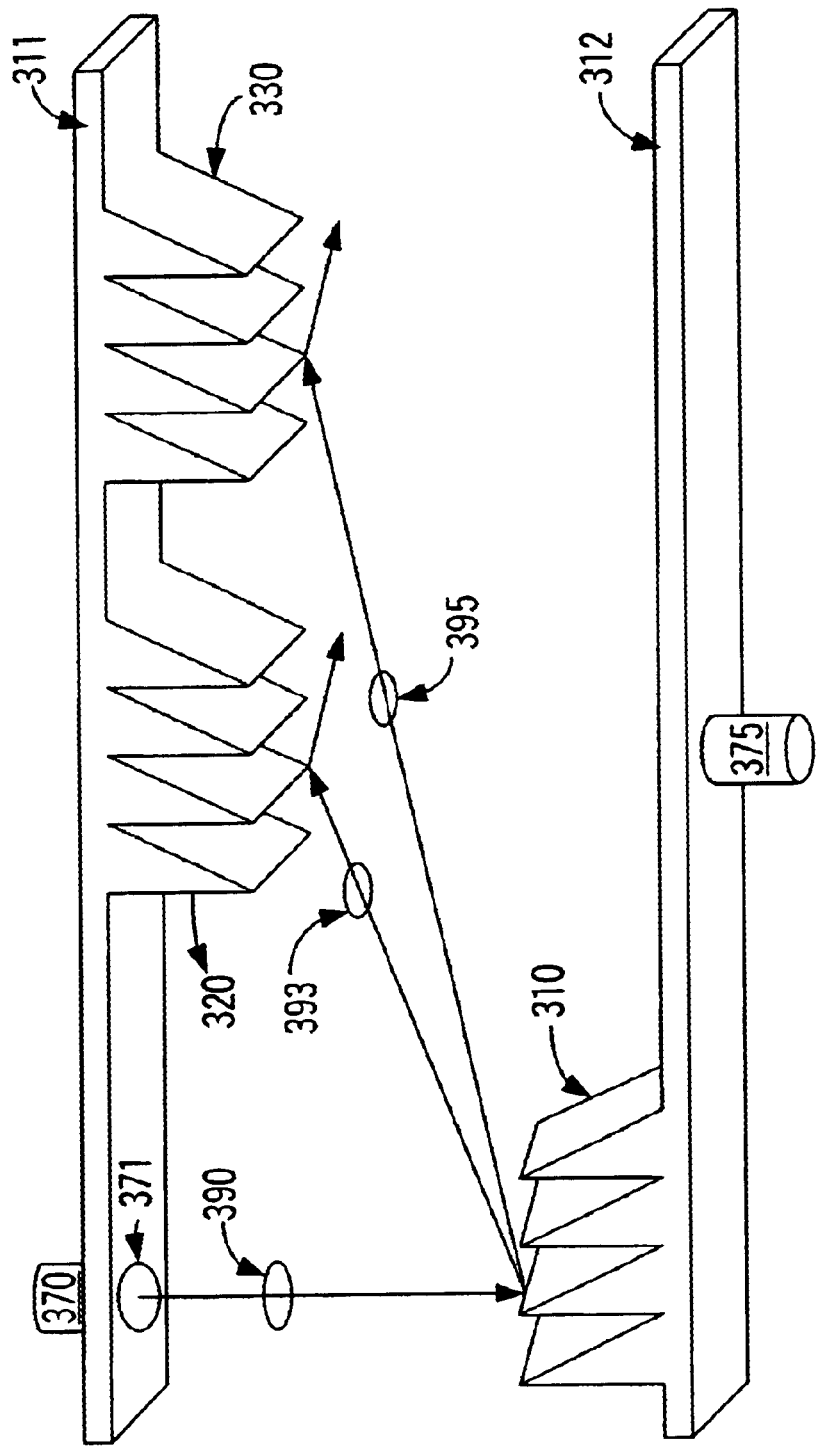
FIG. 3A is a block diagram illustration of cascaded optical switching system, one embodiment of the present invention in which multiple optical signal channels are switched simultaneously.

A present invention cascaded optical switching system is adaptable to manipulate and convey a variety of different optical signals in numerous different cascaded configurations. For example, a present invention cascaded optical switching system is capable of handling a plurality of optical signals simultaneously. FIG. 3 is a block diagram illustration of cascaded optical switching system 300, one embodiment of the present invention. In one exemplary implementation of the present invention, a plurality of optical signals are communicated in one optical signal beam. 390 simultaneously to optical switch 310. In one exemplary implementation, optical signal beam 390 comprises a plurality of optical signals oscillating at different frequencies (e.g., different colors). Optical switch 310 directs the resulting different color optical signal beams to different receivers or paths. For example, optical signal beam 393 oscillating at a first frequency is directed along a first path (e.g., to optical switch 320) and optical signal beam 395 oscillating at a second frequency is directed along a second path (e.g., to optical switch 330). Directing the two optical signal beams along different paths facilitates different manipulation and conveyance of the signals simultaneously. For example, optical signal beam 393 could be directed by optical switch 320 to optical waveguide 375 and optical signal beam 395 could be directed by optical switch 330 along the optical switch fabric to other downstream optical switches (not shown).

In one exemplary implementation of the present invention, a reflective switch is included in the cascaded optical switch fabric. In one embodiment of the present invention, the reflective switch has a reflective mirror surface and the direction it is pointing is adjustable to reflect the optical signal light beam in a different direction. For example, an optical signal beam hits the reflective surface at a particular incidence angle and is reflected to a second destination (e.g., a second reflective switch included in the cascaded optical switch fabric). The direction the reflective surface is pointing is altered (e.g., a mirror rotating on an axis) and the optical switch light beam is reflected to a second destination (e.g., a third reflective switch included in the cascaded optical switch fabric).

Figure 3B:
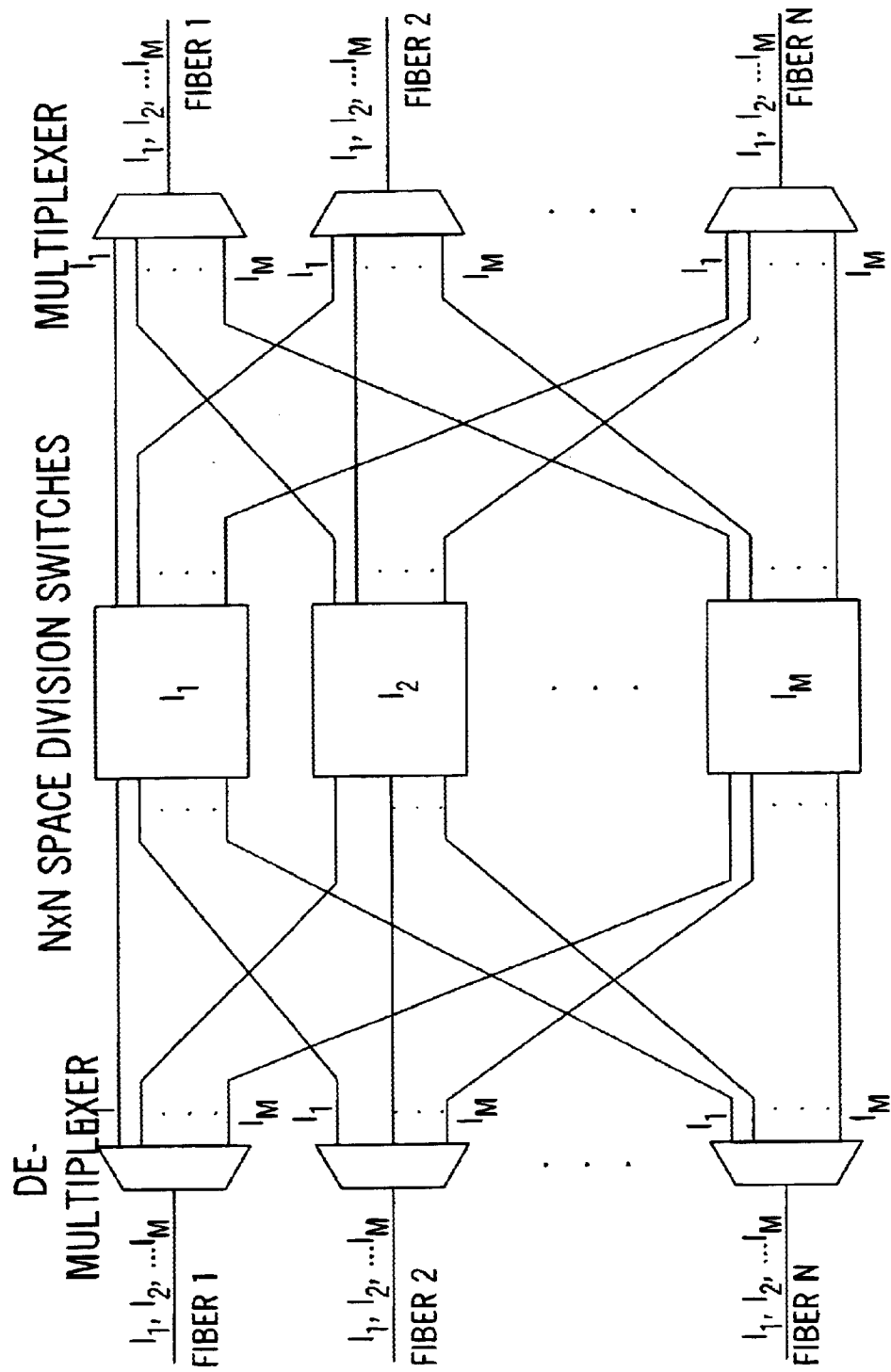
FIG. 3B is a block diagram of one embodiment of an optical cross connect system including a present invention cascaded optical switching system.

A present invention cascaded optical switching system is readily adaptable to provide a variety of functions. FIG. 3B is a block diagram of one embodiment of an optical cross connect system 390 comprising a present invention cascaded optical switching system. In one exemplary implementation, an optical signal beam is directed into optical cross connect system 390 on a fiber cable (e.g., fiber 1, fiber 2, . . . fiber N) and is directed out on another one of the fiber cables (e.g., fiber 1, fiber 2, . . . fiber N).

Figure 4A:
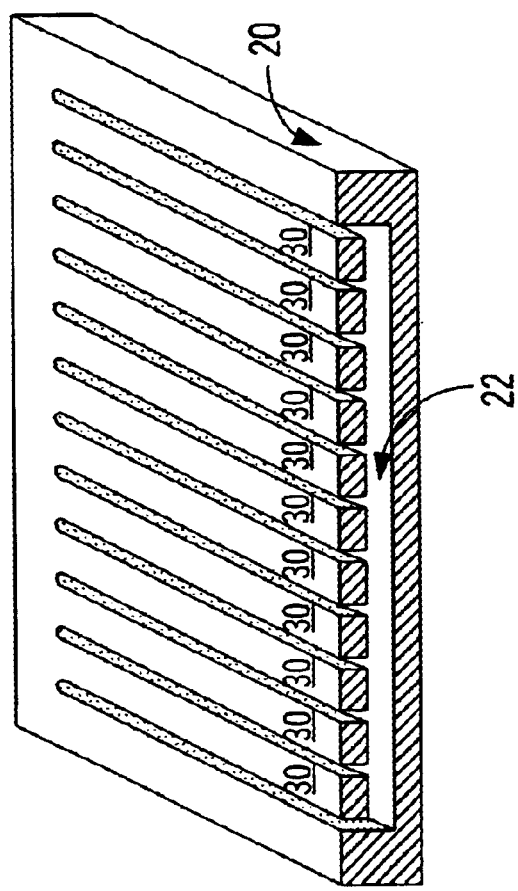
FIG. 4A is a three dimensional block diagram of a dynamically variable grating based optical switch included in one embodiment of the present invention.

FIG. 4A is a three dimensional block diagram of dynamically variable grating based optical switch 10, one example of a dynamically variable grating based optical switch. Dynamically variable grating based optical switch 10 is included in one embodiment of the present invention and includes ribbon micro electromechanical machines (MEMs). In one exemplary implementation of the present invention, dynamically variable grating based optical switch 10 is a grating light valve switch. Dynamically variable grating based optical switch 10 utilizes diffraction to control the direction of an optical signal. The diffraction grating of dynamically variable grating based optical switch 10 comprises multiple ribbons 30 supported in a position relative to one another. In one exemplary implementation multiple ribbons 30 are supported by an integrally attached support base 20.

Figure 4B:
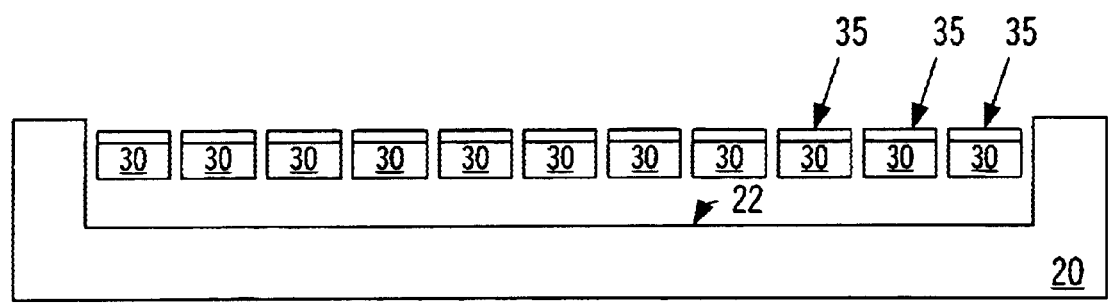
FIG. 4B shows a cross section side view block diagram of grating from an optical switch.
Figure 4C:
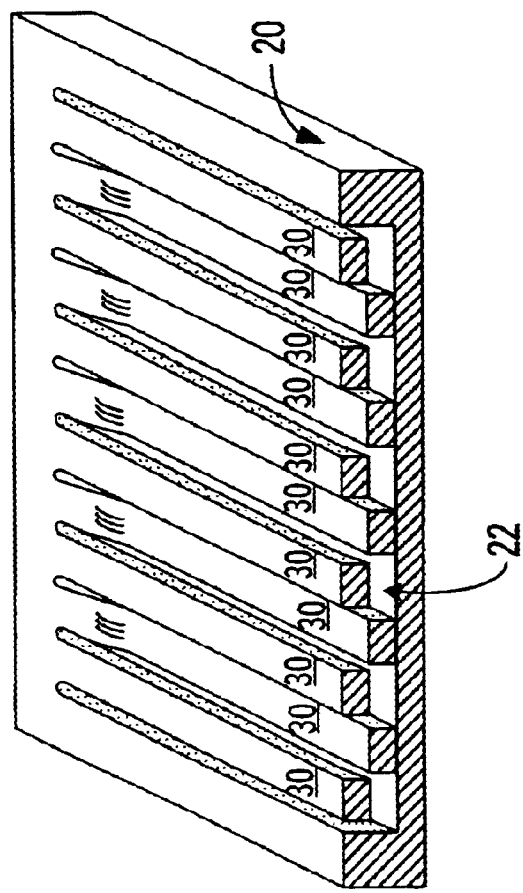
FIG. 4C illustrates a three dimensional cut-away view of the optical switch where the grating is shown with alternating ribbons in a deflected position relative to undeflected ribbons in accordance with one two level grating embodiment of the invention.
Figure 4D:
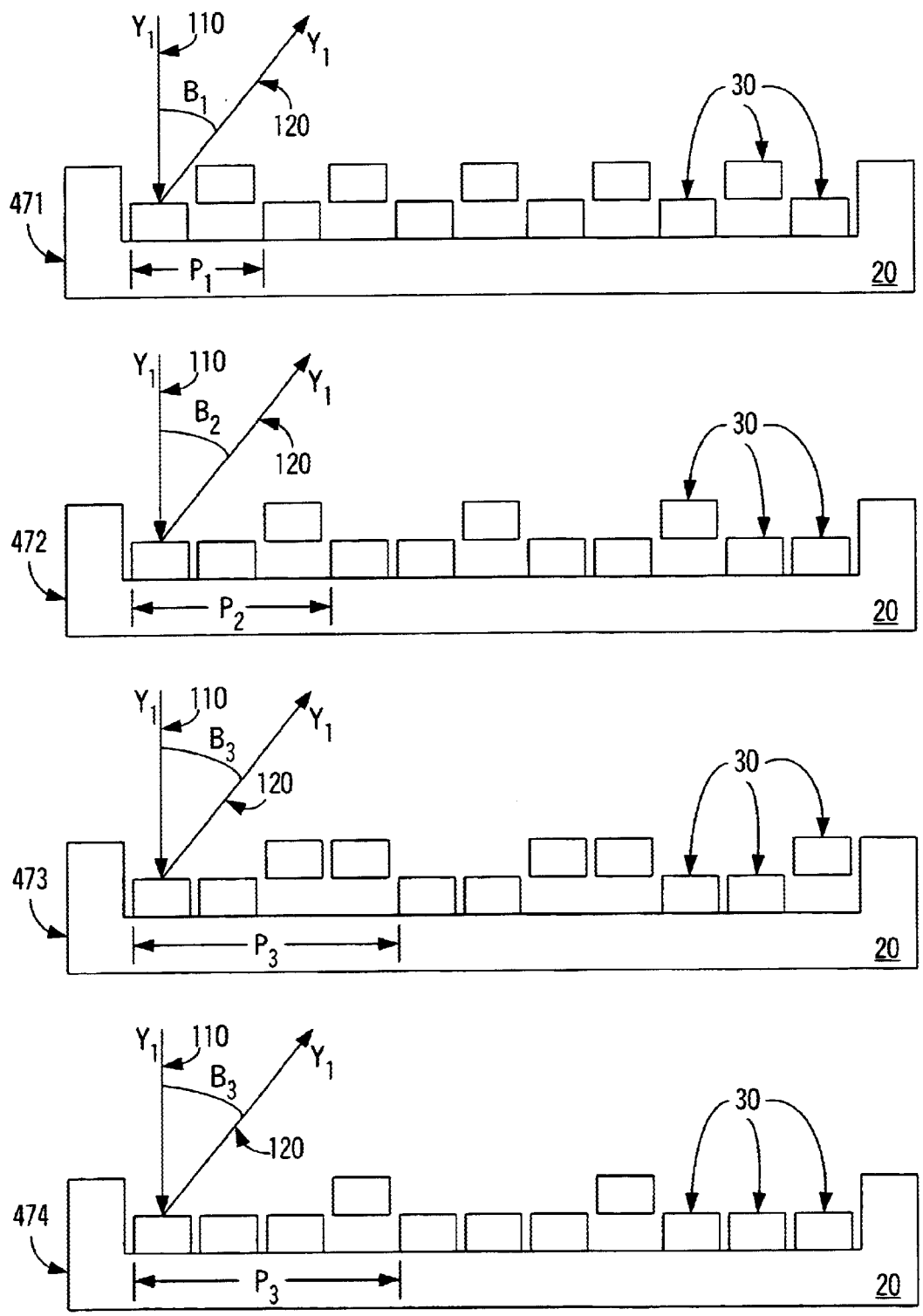
FIG. 4D is a block diagram illustration of a variety of two level configurations for a dynamically variable grating based optical switch.
Figure 4E:
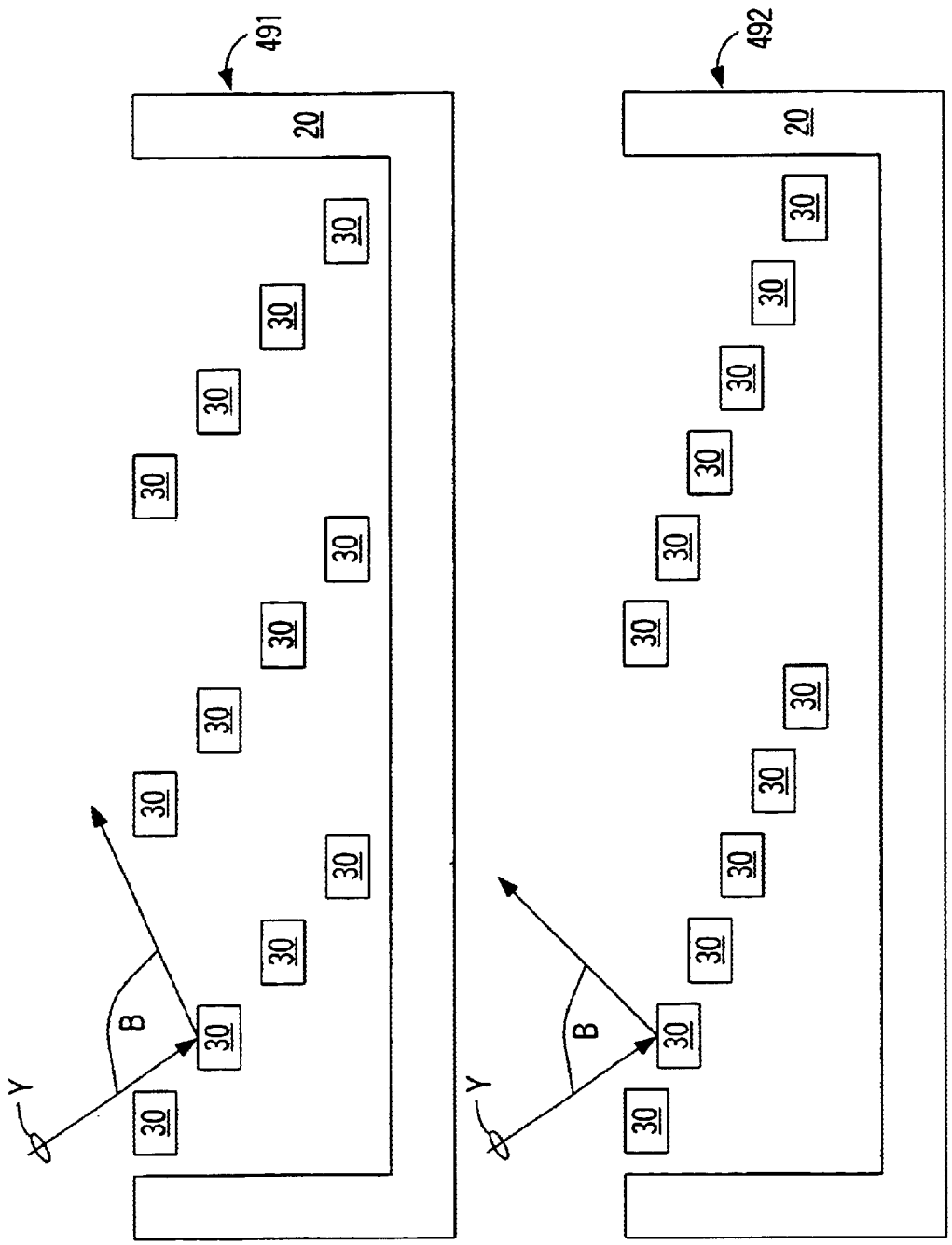
FIG. 4E is a block diagram illustration of a variety of blaze patterns for a dynamically variable grating based optical switch.

FIG. 4B shows a cross section side view block diagram of an exemplary grating included in one embodiment of dynamically variable grating based optical switch 10. In one exemplary implementation of the present invention, each ribbon 30 includes a reflective planar surface 35. The ribbons of the grating are easily arranged in a variety of configurations. For example, the ribbons can be arranged in a two level pattern, a blaze pattern, a sinusoidal pattern, a triangular pattern, a combination of patterns, etc. The ribbons of grating are arranged in a single planar configuration in FIG. 4A and FIG. 4B. FIG. 4C illustrates a three dimensional cut-away view of the optical switch where the grating is shown with alternating ribbons in a deflected position relative to undeflected ribbons in accordance with one two level embodiment of the invention (e.g., forming a square well pattern switch). A two level ribbon arrangement is one in which each ribbon is located in one of two plans. FIG. 4D is a block diagram illustration of a variety of two level configurations 471, 472, 473, and 474. FIG. 4E is a block diagram illustration of blaze patterns 491 and 492.

In one embodiment of the present invention, the ribbons are dynamically varied. In one exemplary implementation of the present invention, the ribbons are dynamically varied by selectively introducing electromagnetic fields that deflect the ribbons. For example, a mechanism for applying an electrostatic force between each ribbon and support base 20 is included. The position of the deflected ribbon is controlled by varying the strength of the applied electric field. Other ways or mechanisms for moving the ribbons relative to one another could be employed. In one exemplary implementation, the ribbons are supported on their ends by slide supports which allow the ribbons to move as rigid bodies with minimal ribbon end deformation.

The configuration style and arrangement of the ribbons govern the diffraction angle of an optical signal beam. In one exemplary implementation of the present invention, mathematical formulas utilized to express the behavior of a diffracted signal beam define the different results that are achievable with different configuration styles and arrangements. For example, the diffraction of an optical signal beam by one configuration of a two level optical switch (e.g., forming a square well pattern) is governed by the equations:

$P=n(W+S)$, where P is the period or pitch, n is the number of ribbons utilized in forming a single grating period, W is the ribbon width, and S is the space between the ribbons; and $B=Arcsin((m*Y*N) \pm Sin\ A)$, where $N=1/P$ or $1/(n(W+S))$, B is the diffraction angle, A is an optical signal impingement or incidence angle, m is the order of the diffraction beam and Y is the wavelength of the optical signal.

One example of an optical signal beam diffraction by a blaze ribbon configuration pattern is defined by the equation:

$B=Arcsin((m*Y*N) \pm sin\ A)$, where $N=1/P$.

For any given A and Y, the value of B can be altered for a given order by controlling N which is done by deflecting the ribbons and manipulating the grating period or pitch (e.g., the number of ribbons in a period). Different ribbon deflection configurations result in different optical signal beam diffractions.

Figure 4F:
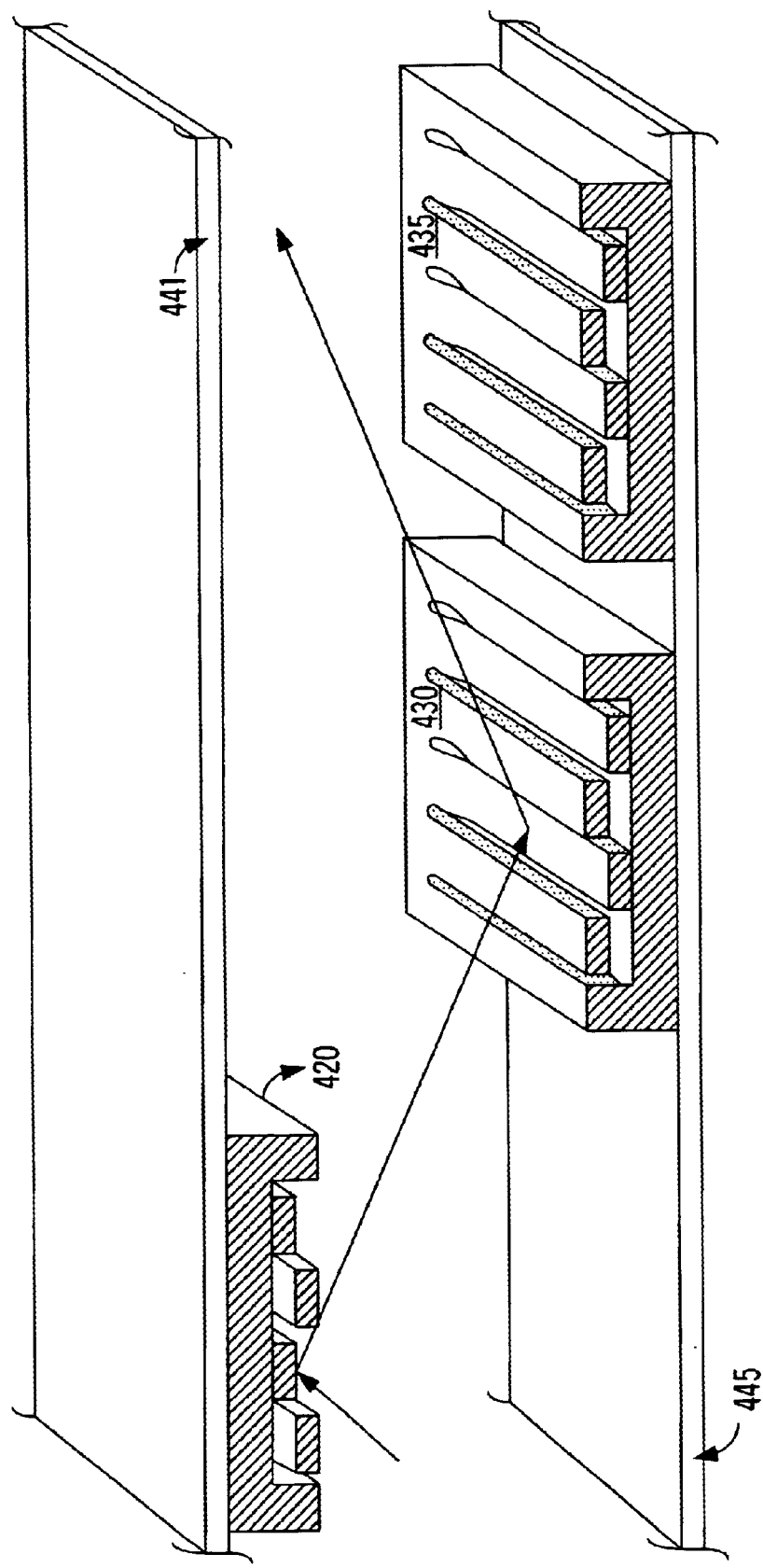
FIG. 4F is a three dimensional block diagram of one embodiment of the present invention in which dynamically variable grating based optical switches are included in cascading topical switch fabric.

FIG. 4F is a three dimensional block diagram of one embodiment of the present invention in which dynamically variable grating based optical switches are included in cascading optical switch fabric. Cascaded optical switching system 400 comprises dynamically variable grating based optical switches 420, 430 and 435, and optical switch support members 441 and 445. Optical switch support member 441 is coupled to optical switch 420 and optical switch support member 442 is coupled to optical switch 430 and 435. In one embodiment of the present invention, cascaded optical switching system 400 comprises additional optical switches (not shown) upstream and downstream from optical switches 410 and 435.

Some embodiments of a present invention cascaded optical switching system facilitate optical signal beam incidence angle "correction" or realignment. The corrected incidence angle enables a plurality of optical switches to be cascaded in a relatively short configuration. For example, the corrected incidence angle is a normal (zero) incidence angle or near normal incidence angle in some implementations of the present invention. The present invention cascaded optical switching system utilizes an incidence corrective device to realign the incidence angle to produce a relatively shallow output angle. The shallow output angle directs the optical signal beam on a path to a close optical switch included in the cascaded optical switch fabric.

Figure 5:
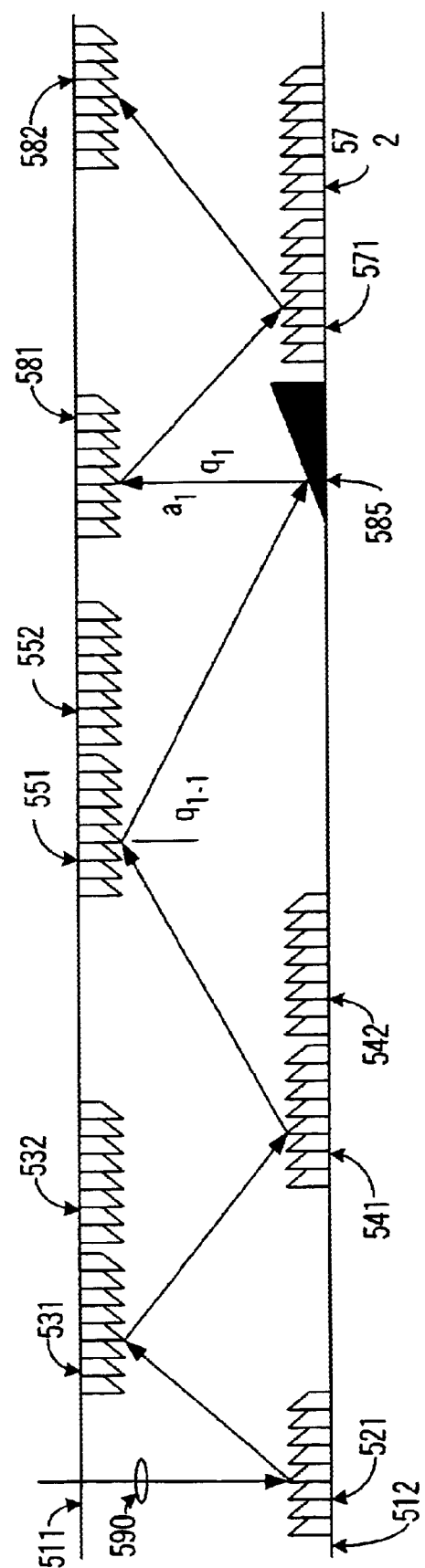
FIG. 5 is a block diagram illustration of cascaded optical switching system, one embodiment of the present invention with a fixed incidence angle regeneration device.

FIG. 5 is a block diagram illustration of cascaded optical switching system 500, one embodiment of the present invention with a fixed incidence angle regeneration device. Cascaded optical switching system 500 includes optical switches 521, 531, 532, 541, 542, 551, 552, 571, 572, 581 and 582, optical switch support members 511 and 512, and incidence corrective device 585. Optical switch support member 511 is coupled to optical switches 531, 532, 551, 552, 581 and 582 and optical switch support member 512 is coupled to incidence corrective device 585 and optical switches 521, 541, 542, 571, and 572. The optical switches and optical switch support members of cascaded optical switching system 500 are similar to those in cascaded optical switching system 100. The incidence corrective device 585 receives an optical signal beam from an optical switch (e.g., optical switch 551) at a first incidence angle and directs it at a second output angle that is shallower than the first incidence angle.

In one embodiment of the present invention, the incidence corrective device 585 directs the optical signal beam at an angle that leads it on a path normal to the base of corrective device 585 coupled to optical switch support member 512. In one exemplary implementation of the present invention, the incidence corrective device 585 directs the optical signal beam at an angle that leads it on a path normal to an optical switch (e.g., optical switch 581) and thereby regenerates a zero angle of incidence at the optical switch. This enables downstream optical switches (e.g., optical switches 571 and 582) to be placed in closer proximity to one another in the cascaded optical switch fabric.

Figure 6:
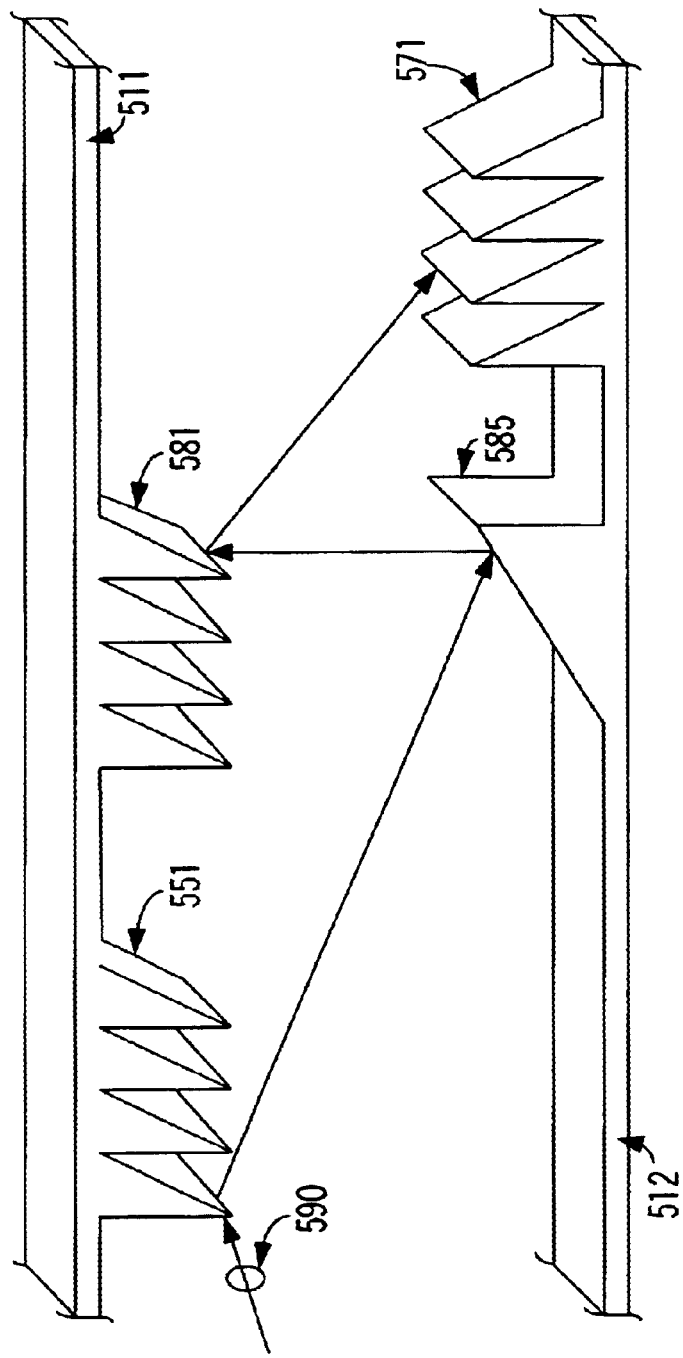
FIG. 6 is a three dimensional representation of a cascaded optical switching system with a fixed incidence angle regeneration device.

A present invention incidence corrective device has a number of configurations and is flexibly adaptable to a number of different implementations. In one embodiment of the present invention, an incidence corrective device includes a fixed reflective component oriented at a particular angle. In one exemplary implementation of the present invention, an incidence corrective device includes a fixed reflective component (e.g., a mirrored surface) oriented at an angle defined by one half the output angle an optical signal beam is forwarded from. For example, the reflective component orientation angle of corrective device 585 is a half of a first output angle (e.g., theta minus one) of an optical signal beam from optical switch 551. The "regenerated" or corrected incidence angle (e.g., alpha) at which the optical signal beam strikes the next optical switch (e.g., optical switch 581) is close to zero. The optical signal beam is forwarded at a second output angle (e.g., theta) that is relatively shallow and permits the optical signal beam to travel on a path directed to an optical switch (e.g., optical switch 571) located in a relatively close proximity on the cascading optical switch path. FIG. 6 is a three dimensional representation of a cascaded optical switching system 500 with a fixed incidence angle regeneration device. In another embodiment, a fixed incidence angle regeneration device is a fresnel mirror device configured with concentric fresnel grooves.

Figure 7A:
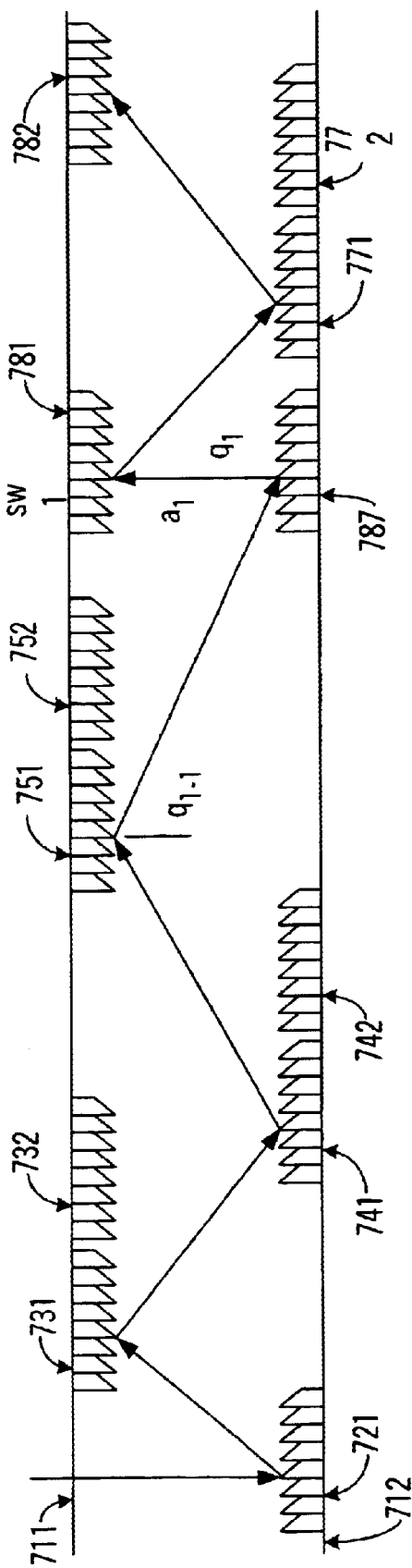
FIG. 7A is a block diagram illustration of cascaded optical switching system, one embodiment of the present invention with a dynamically variable incidence angle regeneration device.

FIG. 7A is a block diagram illustration of cascaded optical switching system 700, one embodiment of the present invention with an incidence corrective device capable of providing dynamically variable incidence angle regeneration. Cascaded optical switching system 700 includes optical switches 721, 731, 732, 741, 742, 751, 752, 771, 772, 781 and 782, optical switch support members 711 and 712, and incidence corrective device 787. Optical switch support member 711 is coupled to switches 731, 732, 751, 752, 781 and 782 and optical switch support member 712 is coupled to incidence corrective device 787 and switches 721, 741, 742, 771, and 772. The optical switches and optical switch support members of cascaded optical switching system 700 are similar to those in cascaded optical switching system 100. The incidence corrective device 787 receives an optical signal beam from an optical switch (e.g., optical switch 751) at a first incidence angle and directs it at a second angle that is shallower than the output angle from a previous optical switch. The output angle of an optical signal beam directed from incidence corrective device 787 is dynamically variable which permits flexible control of optical signal propagation and can direct the optical signal beam so that it strikes a downstream optical switch at a corrected or "regenerated" incidence angle. A corrected or regenerated incidence angle is one that assists the reduction of cumulative detrimental effects associated with a deteriorating or deepening incidence and output angle.

Figure 7B:
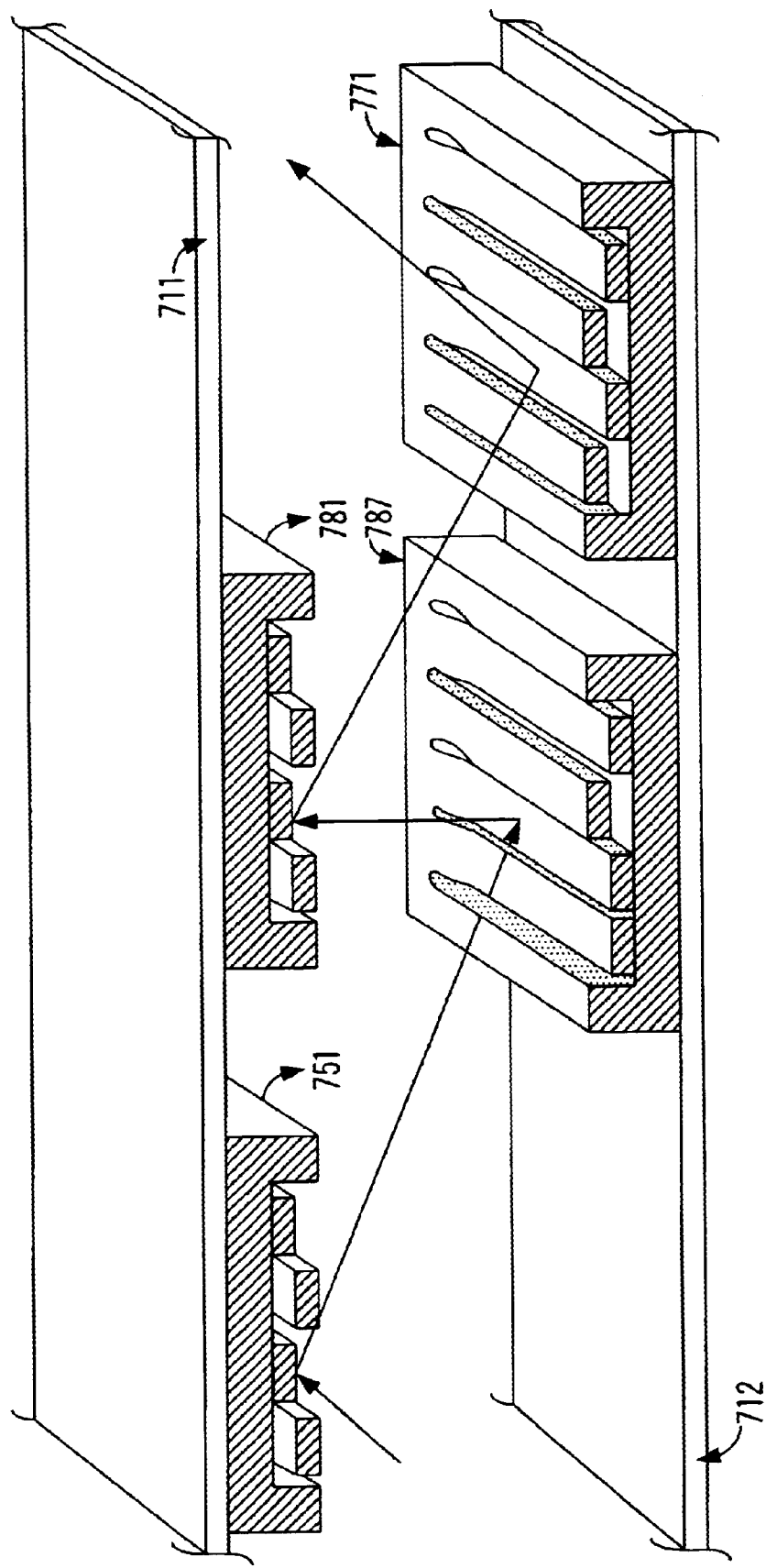
FIG. 7B is a three dimensional block diagram illustration of cascaded optical switching system, one embodiment of the present invention with a dynamically variable incidence angle regeneration device.

As indicated above, a present invention incidence corrective device has a number of configurations and is flexibly adaptable to a number of different implementations. In one of the present invention, an incidence corrective device is a dynamically variable incidence corrective device. In one exemplary implementation of the present invention, a dynamically variable incidence corrective device includes a variable reflective component (e.g., a mirrored surface or a reflective optical switch) capable of being oriented or adjusted to point in a variety of directions. The corrected or "regenerated" incidence angle (e.g., alpha) at which the optical signal beam strikes the next optical switch is close to zero. FIG. 7B is a three dimensional block diagram illustration of cascaded optical switching system 700, one embodiment of the present invention with a dynamically variable incidence corrective device. In one exemplary implementation, the incidence corrective device is a dynamically variable grating based optical switch similar to dynamically variable grating based optical switch 10.

In one embodiment, the present invention includes an optical signal beam spread mitigation device in an optical switch fabric. A present invention optical signal beam spread correction device corrects beam spreading by refocusing the optical signal beam. Refocusing the optical signal beam mitigates signal loss and facilitates efficient interpretation of signal content.

Figure 8A:
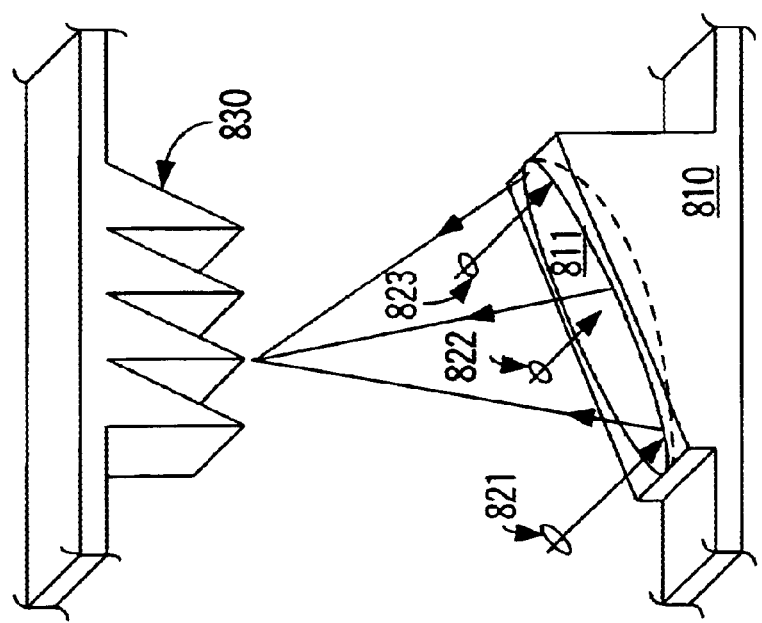
FIG. 8A is a three dimensional block diagram of a fixed angle incidence corrective device that also provides optical signal spread beam correction, one embodiment of the present invention.

FIG. 8A is a three dimensional block diagram of a fixed optical signal beam spread corrective device 810, one embodiment of the present invention. Fixed spread corrective device 810 has a concave reflective face 811 that reflects the optical signal beam in a focusing pattern. In one embodiment of the present invention, fixed optical signal beam spread corrective device 810 also reflects the optical signal beam at a corrected incidence angle. For example, an optical signal beam made up of components 821, 822 and 823 are reflected by dual spread and incidence corrective device 810 to a focal point on optical switch 830. By redirecting the components of the optical signal beam towards a single focal point the optical signal beam is concentrated in a tighter area. Present invention fixed spread corrective devices have a variety of reflective face configurations for converging the beam to a tighter focus (e.g., a concave shaped reflective face, a fresnel mirror, etc.).

Figure 8B:
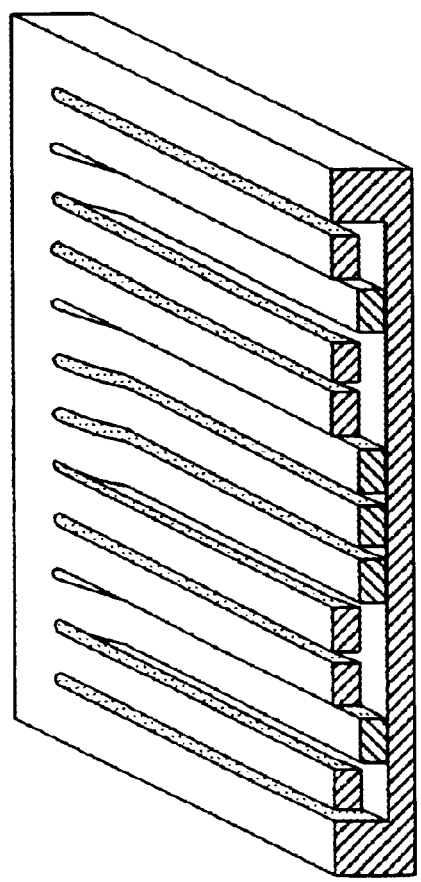
FIG. 8B is a three dimensional block diagram of a dynamically variable and incidence beam corrective device that also provides optical signal beam spread correction, one embodiment of the present invention.

FIG. 8B is a three dimensional block diagram of a spread corrective device 870, one embodiment of the present invention with dynamically variable spread corrective capabilities that also performs spread correction. Dynamically variable spread corrective device 870 forms a chirped reflective face that reflects the optical signal beam in a converging pattern. In one exemplary implementation, the dynamically variable spread is a dynamically variable grating based optical switch (similar to dynamically variable grating based optical switch 10) and the ribbons are deflected so that a chirped grating pattern is formed in which the periodicity gradually decreases towards the periphery. The deflection of the ribbons is dynamically variable and facilitates flexible control of an optical signal. In one embodiment of the present invention, spread corrective device 870 performs dual spread and incidence angle correction functions.

The incidence angle correction devices and beam spread correction devices can include a reflective component or a diffractive component and may be fixed or dynamically variable. In one embodiment of the present invention, incidence angle correction and beam spread correction are provided by a single optical device. In one exemplary implementation, a dual purpose spread and incidence corrective device corrects incidence degeneration problems by redirecting the focused optical signal beam along a vector that is normal to the switching stage. For example, spread corrective devices 810 and 870 are capable of performing dual spread and incidence angle correction functions. In one embodiment of the present invention, a dual purpose corrective device is included in a cascading optical switch fabric in place of an incidence corrective device (e.g., incidence corrective device 585 or 787).

Figure 9:
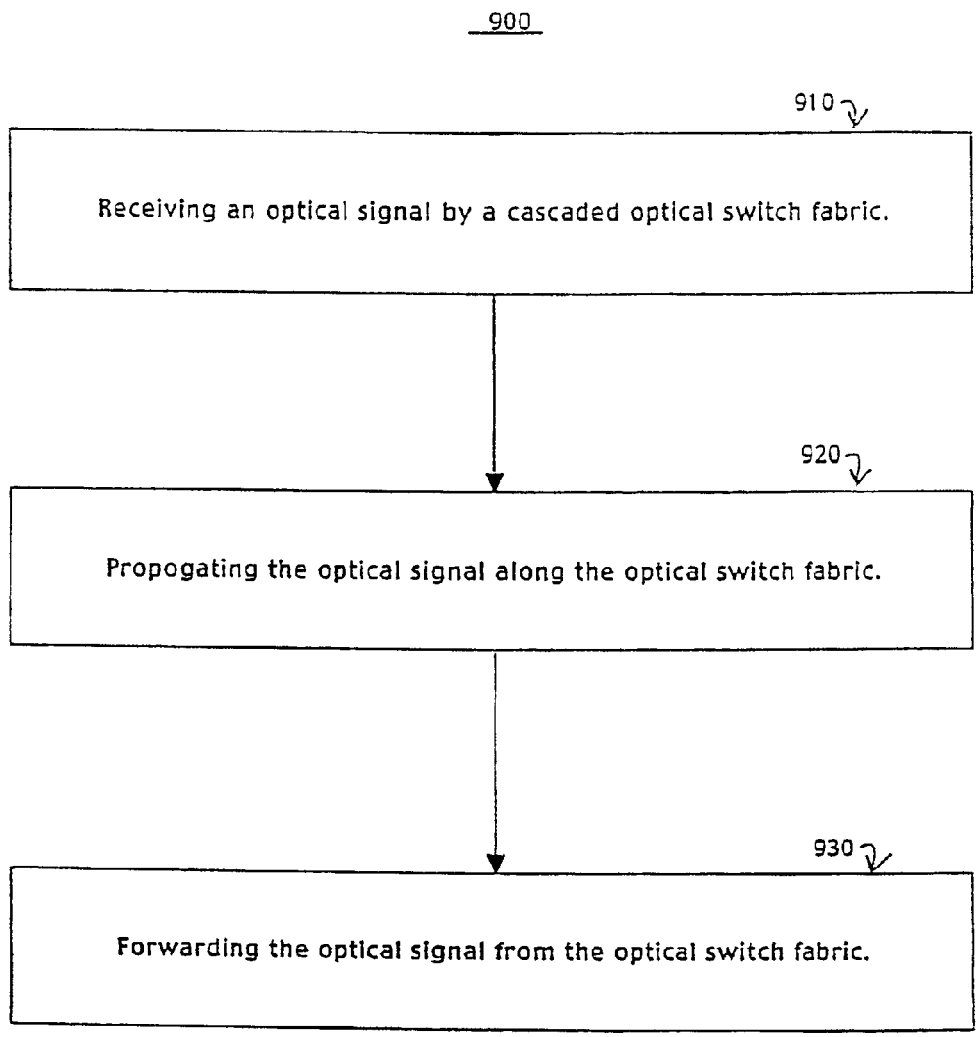
FIG. 9 is a flow chart of a cascaded optical switching method, one embodiment of the present invention.

FIG. 9 is a flow chart of cascaded optical switching method 900, one embodiment of the present invention. In one embodiment of the present invention, cascaded optical switching method 900 includes an optical signal beam incidence angle regeneration process. In one embodiment of the present invention, cascaded optical switching method 900 includes an optical signal beam spread corrective process.

In step 910, an optical signal beam is received by a cascaded optical switch fabric. In one exemplary implementation of the present invention the optical signal beam is introduced to a cascading optical s witch fabric from a waveguide (e.g., a fiber optic cable).

In step 920, the optical signal beam is propagated along the optical switch fabric. In one embodiment of the present invention, the optical signal beam is received by a number of optical switching points and the continued path direction of the optical signal beam is controlled. In one embodiment of the present invention, the optical switching points are arranged in a cascaded order or configuration. In one exemplary implementation, optical signals are received by optical switching points, including a dynamically variable grating based optical switch.

In one embodiment, cascaded optical switching method 900 includes reflecting an optical signal beam in a particular direction to another switching point. In one exemplary implementation, the direction of the reflection is dynamically varied, which in turn varies the direction of the optical signal beam. In one embodiment, cascaded optical switching method 900 includes dynamically varying the grating pitch within a light diffraction grating of a dynamically variable grating based optical switch, which in turn varies the diffraction angle of an optical signal beam switched by the dynamically variable grating based optical switch. In one exemplary implementation of the present invention, step 920 includes independently moving each ribbon of the dynamically variable grating based optical switch in coordination with other ribbons to provide a dynamically varying grating pitch. For example, cascaded optical switching method 900 includes applying an electromagnetic field in the proximity of the ribbons which causes the ribbons to move (e.g., deflect).

In step 930, the optical signal beam is forwarded away from the optical switch fabric. In one embodiment of the present invention, the optical signal beam is forwarded to an external waveguide (e.g., a fiber optic cable).

In one embodiment of the present invention, the optical signal beams are forwarded ("regenerated") at a desired incidence angle to the destination (e.g., a corrected incidence angle). In one embodiment, an incidence angle is dynamically corrected so that said optical signal beam is forwarded at a relatively shallow output angle. In one exemplary implementation, the desired incidence angle is one that results in a shallow output angle. For example, the "regenerated" incidence angle (e.g., alpha) of the optical signal beam strikes the next cascaded optical switch at an angle that is close to zero. The optical signal beam is forwarded at a second output angle (e.g., theta) that is relatively shallow and permits the optical signal beam to travel on a path directed to an optical switch located in a relatively close proximity on the cascading optical switch fabric path.

In one exemplary implementation of the present invention, the optical signal beam is forwarded by an incidence corrective device that includes a fixed reflective component (e.g., a mirrored surface) oriented at a set angle (e.g., an angle defined by one half the output angle an optical signal beam is forwarded from). In one exemplary implementation of the present invention, the optical signal beam is forwarded by an incidence corrective device that includes dynamically variable grating based optical switch ribbons deflected in a manner that propagates an optical signal beam on a path that is normal to a cascaded second optical switch. In one embodiment of step 930, an optical signal beam is directed away in a manner that corrects spread problems by refocusing the optical signal beam in a tighter pattern.

Thus, the present invention facilitates the inclusion of a number of switches in a cascaded device in a manner that facilitates efficient optical signal switching. The present invention cascaded optical switching system and method facilitate minimization of cumulative detrimental impacts associated with cumulatively increasing incidence/output angles and spreading of an optical signal beam. A present invention cascaded optical switching system "regenerates" an optical signal beam path with a realigned or corrected incidence angle. In one embodiment of the present invention, the corrected incidence angle facilitates shortening the cascading optical switch fabric length. Correcting the incidence angle also facilitates utilization of optical switches that are economical to manufacture, however, have limited switching range (e.g., switch with limited reflection or diffraction movement). In one exemplary implementation, a present invention cascaded optical switching system refocuses spreading optical signal beams and mitigates signal loss.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A cascaded optical switching system comprising:
   a plurality of cascaded optical switches that form an optical switch fabric and direct an optical signal beam from one optical switch of said plurality of cascaded optical switches to another optical switch of said plurality of cascaded optical switches while providing variable incidence angle correction; and
   an optical switch support member for supporting said plurality of cascaded optical switches in a cascaded configuration that is compatible with directing said optical signal beam within the boundaries of said optical switch fabric, said optical switch support member coupled to said plurality of cascaded optical switches.

2. The cascaded optical switching system of claim 1 wherein said plurality of cascaded optical switches include dynamically variable grating based optical switches for diffracting said optical signal beam, wherein a diffraction angle B of said optical signal beam is governed by the equation:

$$B = \text{Arcsin}((m*Y/(n(w+s))) \pm \text{Sin } A),$$

where B is the diffraction angle, A is an optical signal incidence angle, m is the order of the diffraction beam, Y is the wavelength of the optical signal, n is the number of ribbons utilized in forming a single grating period, W is the ribbon width, and S is the space between ribbons.

3. The cascaded optical switching system of claim 1 wherein said plurality of cascaded optical switches include reflective optical switches.

4. The cascaded optical switching system of claim 1 wherein said optical switch support member includes an optical waveguide receiver for permitting bi-directional propagation of optical signal beams into or out of said optical switch fabric.

5. The cascaded optical switching system of claim 4 wherein said optical signal beam enters said optical switch fabric and is directed by said plurality of cascaded optical switches to said optical waveguide receiver.

6. The cascaded optical switching system of claim 1 wherein said plurality of cascaded optical switches are arranged in cascaded switching stages in which each stage includes multiple cascaded optical switches.

7. The cascaded optical switching system of claim 1 wherein said plurality of optical switches directs a plurality of optical signals simultaneously.

8. A cascaded optical switch system comprising:
a plurality of cascaded optical switches that form an optical switch fabric and direct an optical signal beam from one of said plurality of cascaded optical switches to another optical switch of said plurality of cascaded optical switches;
an optical switch support member for supporting said plurality of cascaded optical switches in a cascaded configuration that is compatible with directing said optical signal beam within the boundaries of said optical switch fabric, said optical switch support member coupled to said plurality of cascaded optical switches; and
an incidence corrective device for realigning an incidence angle, wherein said incidence corrective device includes a dynamic component that controls said realigning of said incidence angle, said incidence corrective device is coupled to said optical switch support member.

9. The cascaded optical switch system of claim 8 wherein said aligned incidence angle is a normal (zero) incidence angle.

10. The cascaded optical switch system of claim 8 wherein incidence corrective device realigns said optical signal beam so that the incidence angle said optical signal strikes one of said plurality of cascaded optical switches downstream in said optical switch fabric produces a relatively shallow output angle.

11. The cascaded optical switch system of claim 10 wherein said relatively shallow output angle directs said optical signal beam to one of said plurality of cascaded optical switches downstream in said optical switch fabric, one of said plurality of cascaded optical switches is relatively close to said incidence corrective device.

12. The cascaded optical switch system of claim 10 wherein said incidence corrective device receives an optical signal beam from one of said plurality of cascaded optical switches at a first output angle and directs it at another one of said plurality of cascaded optical switches at a second output angle that is shallower than said first output angle.

13. The cascaded optical switch system of claim 10 wherein said incidence corrective device corrects incidence degeneration of an optical signal.

14. A cascaded optical switch system of claim 13 wherein said incidence corrective device corrects spread problems by refocusing the optical signal beam in a tighter pattern.

15. A cascaded optical switching method comprising the steps of:
receiving an optical signal beam by a cascaded optical switch fabric;
propagating said optical signal along dynamically variable optical switches included in said cascaded optical switch fabric;
correcting an incidence angle dynamically so that said optical signal beam is forwarded at a relatively shallow output angle, and
forwarding said optical signal beam from said cascaded optical switch fabric.

16. A cascaded optical switching method of claim 15 wherein said cascaded optical switch fabric is in a single plane.

17. The cascaded optical switching method of claim 15 further comprising the steps of:
receiving said optical signal beam by an optical switch included in said cascaded optical switch fabric; and
forwarding said optical signal beam from said optical switch included in said cascaded optical switch fabric.

18. The cascaded optical switching method of claim 17 wherein said optical signal beam is received by said optical switch at an incidence angle and is forwarded at a dynamically adjustable shallower output angle.

19. The cascaded optical switching method of claim 18 wherein the incidence angle is adjusted so that the output angle forwards the optical signal to another optical switch included in said cascaded optical switch fabric at a relatively close location.

20. The cascaded optical switching method of claim 15 further comprising the step of correcting cumulative spread impacts on said optical signal beam.

21. A cascaded optical switching system comprising:
a plurality of cascaded optical switches that form an optical switch fabric and direct an optical signal beam from one optical switch of said plurality of cascaded optical switches to another optical switch of said plurality of cascaded optical switches while providing variable incidence angle correction, wherein said plurality of cascaded optical switches include dynamically variable grating based optical switches for diffracting said optical signal beam, wherein a diffraction angle B of said optical signal beam is governed by the equation:

$$B = \text{Arcsin}((m*Y/(n(w+s))) \pm \text{Sin } A),$$

where B is the diffraction angle, A is an optical signal incidence angle, m is the order of the diffraction beam, Y is the wavelength of the optical signal, n is the number of ribbons utilized in forming a single grating period, W is the ribbon width, and S is the space between the ribbons; and an optical switch support member for supporting said plurality of cascaded optical switches in a cascaded configuration that is compatible with directing said optical signal beam within the boundaries of said optical switch fabric, said optical switch support member coupled to said plurality of cascaded optical switches.

* * * * *